US012637795B2

(12) United States Patent
    Dunn

(10) Patent No.: US 12,637,795 B2
(45) Date of Patent: May 26, 2026

(54) CONDITIONING SYSTEM FOR A COMBINATION LAUNDRY APPLIANCE

(71) Applicant: Haier US Appliance Solutions, Inc., Wilmington, DE (US)

(72) Inventor: David Scott Dunn, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 429 days.

(21) Appl. No.: 18/362,318

(22) Filed: Jul. 31, 2023

(65) Prior Publication Data
    US 2025/0043479 A1     Feb. 6, 2025

(51) Int. Cl.
    *D06F 25/00*     (2006.01)
    *D06F 58/20*     (2006.01)
    *D06F 58/24*     (2006.01)
    *F16J 15/02*     (2006.01)

(52) U.S. Cl.
    CPC .............. *D06F 25/00* (2013.01); *D06F 58/20* (2013.01); *D06F 58/206* (2013.01); *D06F 58/24* (2013.01); *F16J 15/022* (2013.01)

(58) Field of Classification Search
    None
    See application file for complete search history.

(56) References Cited

U.S. PATENT DOCUMENTS

2010/0005680 A1     1/2010   Kim et al.

FOREIGN PATENT DOCUMENTS

| CN | 210196453 U | 3/2020 |
| JP | 2005253589 A | 9/2005 |
| JP | 2020039527 A | 3/2020 |
| KR | 200477821 Y1 | 8/2015 |

*Primary Examiner* — Levon J Shahinian
(74) *Attorney, Agent, or Firm* — Dority & Manning, P.A.

(57)            ABSTRACT

A laundry appliance includes a tub positioned within a cabinet, a wash basket rotatably mounted within the tub, the wash basket defining a chamber for receipt of articles for washing and drying, a duct system fluidly coupled to the chamber and defining a process air flow path, and a conditioning system fluidly coupled to the process air flow path. The conditioning system includes a housing comprising a first portion and a second portion that are joined to form a sealed compartment, wherein a groove is defined in a sealing face of at least one of the first portion or the second portion, a sealed system positioned within the sealed compartment for conditioning air within the process air flow path, a sealing element positioned within the groove, and a protruding feature extending into the groove for deforming the sealing element when the first portion and the second portion are joined.

20 Claims, 7 Drawing Sheets

CONDITIONING SYSTEM FOR A COMBINATION LAUNDRY APPLIANCE

FIELD OF THE INVENTION

The present subject matter relates generally to combination washer/dryer laundry appliances, or more specifically, to a housing for a conditioning system in a combination laundry appliance.

BACKGROUND OF THE INVENTION

Laundry appliances are commonly sold in appliance pairs, e.g., a washing machine appliance for washing clothes and a dryer appliance for drying clothes. By contrast, certain conventional laundry appliances are combination washer/ dryer units that wash and dry clothes in the same drum. Accordingly, during a washing cycle of a combination laundry appliance, wash fluid is added to the drum, the load of clothes is agitated during an agitation cycle, a rinse cycle is performed, and a spin cycle is used to extract excess water from the load of clothes while a drain pump evacuates the wash fluid in the drum. After the washing operation is complete, the combination laundry may switch to a drying cycle, where the clothes are tumbled as warm, dry air is circulated within the drum.

In order to facilitate a drying cycle of the combination laundry appliance, a motor rotates the drum, e.g., to tumble articles located within a chamber defined by the drum. In addition, combination laundry appliances generally include a system for passing dry, heated air through the chamber in order to dry moisture-laden articles positioned therein. In this regard, the appliance includes a sealed system or a conditioning system for extracting moisture and heating a flow of air passing through the drum. The conditioning system may include a compressor, a condenser, and an evaporator. Typically, an air handler or blower is used to urge the flow of heated air through the chamber to dry the clothes.

Notably, the sealed system of conventional laundry appliances includes heat exchangers, process air flow paths, and other system components contained within a sealed system housing. A conventional sealed system housing includes a rubber O-ring sandwiched between two portions of a sealed system housing. Notably, when the air path is sealed using such an O-ring configuration, a large compression force is needed to create an airtight sealed system. As such, system assembly is complex, requires a large number of fasteners, etc. Moreover, failure to achieve an airtight system results in lost thermal energy and/or the ejection of hot/humid air into the ambient environment, resulting in energy loss and poor system performance.

Accordingly, a combination washer/dryer appliance with an improved sealed system would be desirable. More specifically, a sealed system with improved sealing of the process air flow path with a minimal number of parts and assembly costs would be particularly beneficial.

BRIEF DESCRIPTION OF THE INVENTION

Advantages of the invention will be set forth in part in the following description, or may be apparent from the description, or may be learned through practice of the invention.

In one exemplary embodiment, a laundry appliance is provided including a tub positioned within a cabinet, a wash basket rotatably mounted within the tub, the wash basket defining a chamber for receipt of articles for washing and drying, a duct system fluidly coupled to the chamber and defining a process air flow path, and a conditioning system fluidly coupled to the process air flow path. The conditioning system includes a housing comprising a first portion and a second portion that are joined to form a sealed compartment, wherein a groove is defined in a sealing face of at least one of the first portion or the second portion, a sealed system positioned within the sealed compartment for conditioning air within the process air flow path, a sealing element positioned within the groove, and a protruding feature extending into the groove for deforming the sealing element when the first portion and the second portion are joined.

In another exemplary embodiment, a conditioning system for a laundry appliance is provided. The conditioning system includes a housing comprising a first portion and a second portion that are joined to form a sealed compartment, wherein a groove is defined in a sealing surface of at least one of the first portion or the second portion, a sealed system positioned within the sealed compartment for conditioning air within a process air flow path, a sealing element positioned within the groove, and a protruding feature extending into the groove for deforming the sealing element when the first portion and the second portion are joined.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
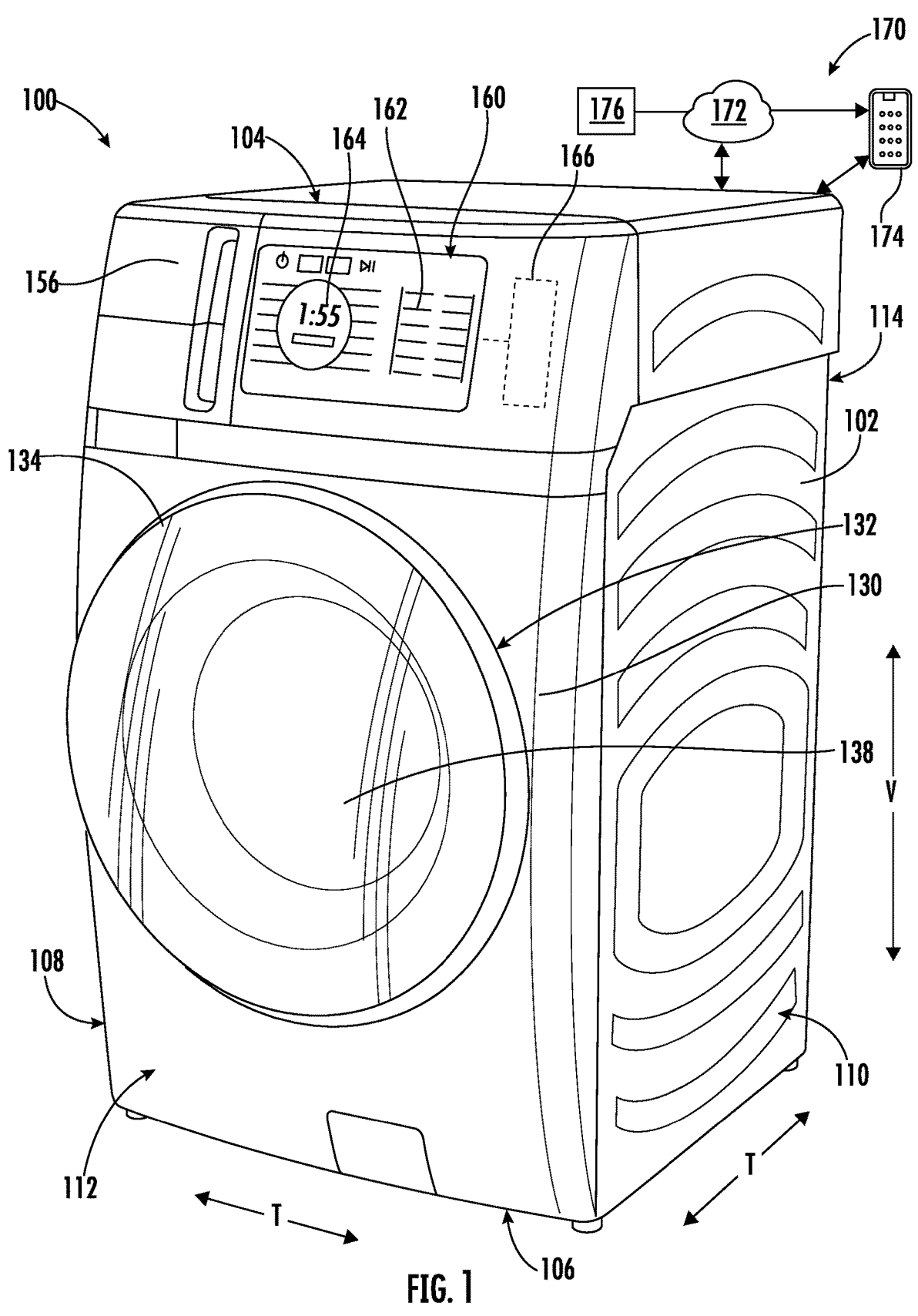
FIG. 1 provides a perspective view of a combination washer/dryer laundry appliance in accordance with exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

Figure 2:
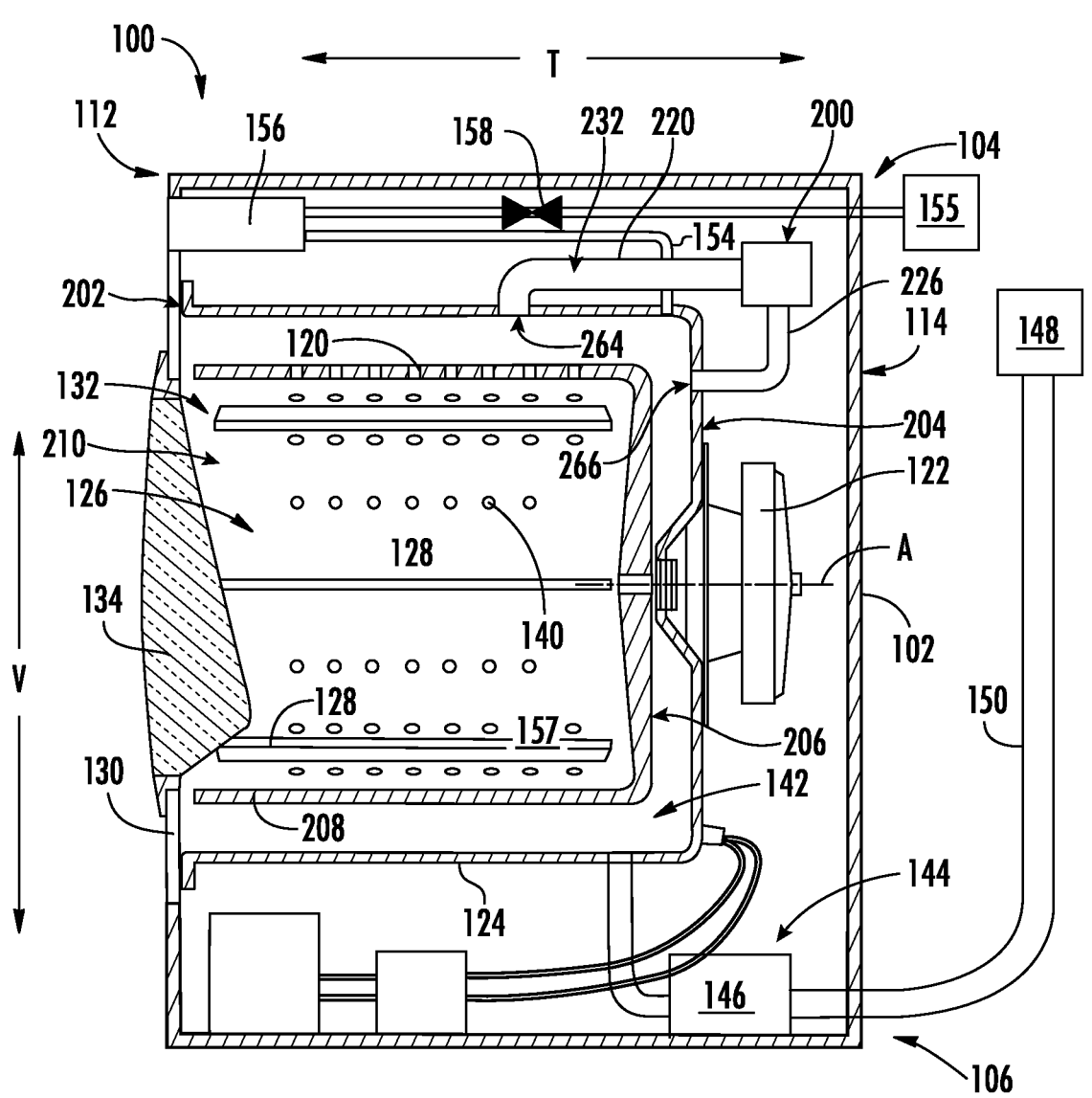
FIG. 2 provides a side cross-sectional view of the exemplary laundry appliance of FIG. 1.
Figure 4:
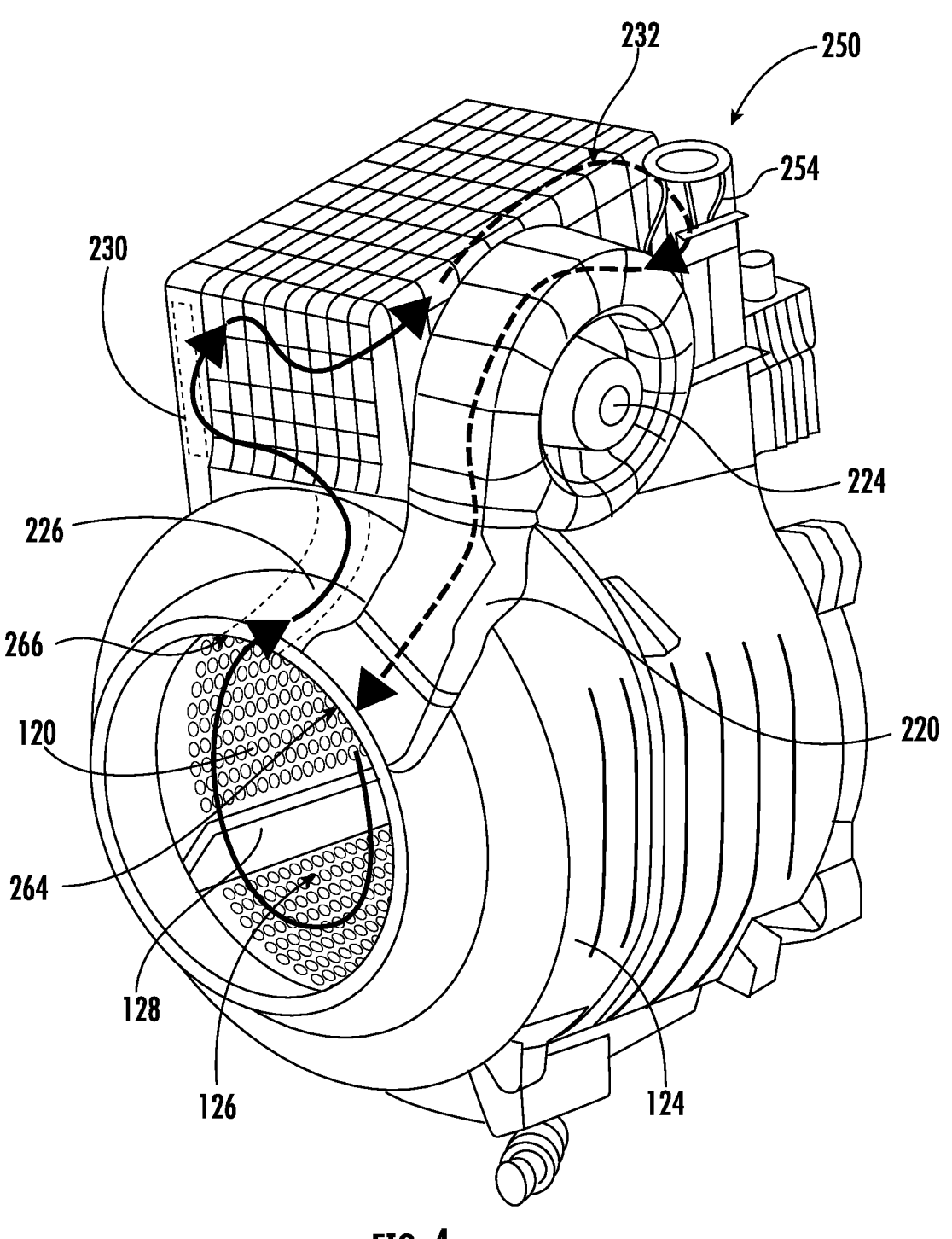
FIG. 4 provides a perspective view of the example laundry appliance of FIG. 1 with a cabinet of the laundry appliance removed to reveal certain components of the dryer appliance.
Figure 5:
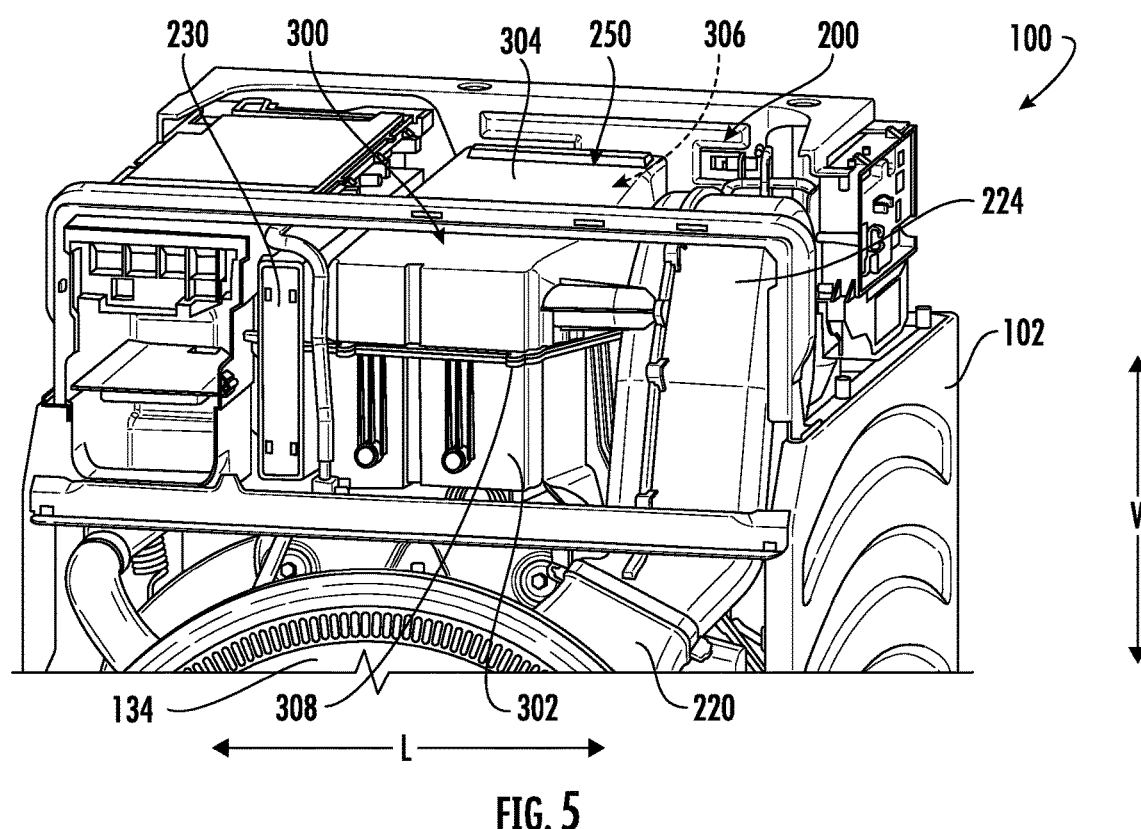
FIG. 5 provides a perspective view of the example laundry appliance of FIG. 1 with an upper panel of the laundry appliance removed to reveal certain components of the dryer appliance.
Figure 6:
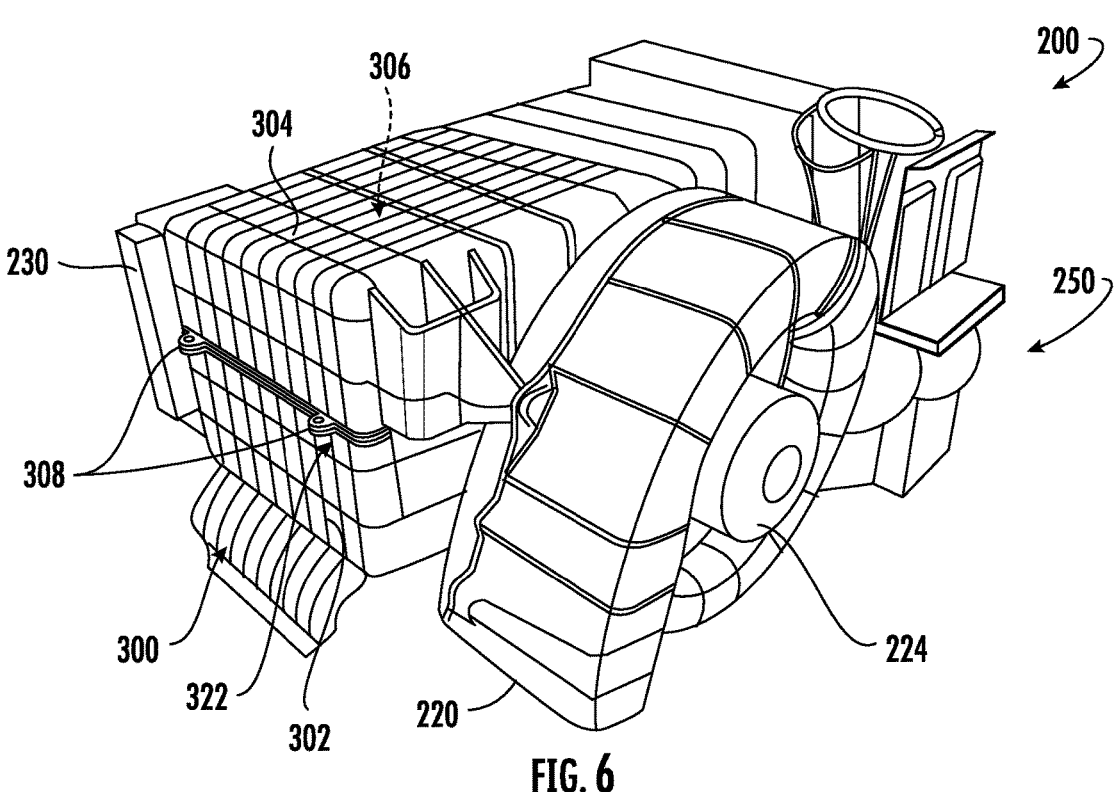
FIG. 6 provides a perspective view of the exemplary conditioning system of FIG. 3 in accordance with exemplary embodiments of the present disclosure.

Referring now to the figures, an exemplary laundry appliance that may be used to implement aspects of the present subject matter will be described. Specifically, FIG. 1 is a perspective view of an exemplary horizontal axis washer and condenser dryer combination appliance 100, referred to herein for simplicity as laundry appliance 100. FIG. 2 is a side cross-sectional view of laundry appliance 100. FIG. 4 is a perspective view of laundry appliance 100 with cabinet 102 removed. As illustrated, laundry appliance 100 generally defines a vertical direction V, a lateral direction L, and a transverse direction T, each of which is mutually perpendicular, such that an orthogonal coordinate system is generally defined. Laundry appliance 100 includes a cabinet 102 that extends between a top 104 and a bottom 106 along the vertical direction V, between a left side 108 and a right side 110 along the lateral direction, and between a front 112 and a rear 114 along the transverse direction T.

Referring to FIG. 2, a laundry basket 120 is rotatably mounted within cabinet 102 such that it is rotatable about an axis of rotation A. According to the illustrated embodiment, axis of rotation A is substantially parallel to or slightly inclined relative to the horizontal direction (e.g., the transverse direction T), as this exemplary appliance is a front load appliance. A motor 122, e.g., such as a pancake motor, is in mechanical communication with laundry basket 120 to selectively rotate laundry basket 120 (e.g., during an agitation or a rinse cycle of laundry appliance 100). Motor 122 may be mechanically coupled to laundry basket 120 directly or indirectly, e.g., via a pulley and a belt (not pictured). Laundry basket 120 is received within a tub 124 that defines a chamber 126 that is configured for receipt of articles for washing or drying.

As used herein, the terms "clothing" or "articles" includes but need not be limited to fabrics, textiles, garments, linens, papers, or other items from which the extraction of moisture is desirable. Furthermore, the term "load" or "laundry load" refers to the combination of clothing that may be washed together and/or dried together in laundry appliance 100 (e.g., the combination washer and condenser dryer) and may include a mixture of different or similar articles of clothing of different or similar types and kinds of fabrics, textiles, garments and linens within a particular laundering process.

The tub 124 holds wash and rinse fluids for agitation in laundry basket 120 within tub 124. As used herein, "wash fluid" may refer to water, detergent, fabric softener, bleach, or any other suitable wash additive or combination thereof. Indeed, for simplicity of discussion, these terms may all be used interchangeably herein without limiting the present subject matter to any particular "wash fluid."

Laundry basket 120 may define one or more agitator features that extend into chamber 126 to assist in agitation, cleaning, and drying of articles disposed within chamber 126 during operation of laundry appliance 100. For example, as illustrated in FIG. 2, a plurality of baffles or ribs 128 extend from basket 120 into chamber 126. In this manner, for example, ribs 128 may lift articles disposed in laundry basket 120 and then allow such articles to tumble back to a bottom of drum laundry basket 120 as it rotates. Ribs 128 may be mounted to laundry basket 120 such that ribs 128 rotate with laundry basket 120 during operation of laundry appliance 100.

Referring generally to FIGS. 1 and 2, cabinet 102 also includes a front panel 130 which defines an opening 132 that permits user access to laundry basket 120 and tub 124. More specifically, laundry appliance 100 includes a door assembly 134 that is positioned over opening 132 and is rotatably mounted to front panel 130. In this manner, door assembly 134 permits selective access to opening 132 by being movable between an open position (not shown) facilitating access to a tub 124 and a closed position (FIG. 1) prohibiting access to tub 124. Laundry appliance 100 may further include a latch assembly that is mounted to cabinet 102 and/or door assembly 134 for selectively locking door assembly 134 in the closed position. The latch assembly may be desirable, for example, to ensure only secured access to chamber 126 or to otherwise ensure and verify that door assembly 134 is closed during certain operating cycles or events.

A window 138 in door assembly 134 permits viewing of laundry basket 120 when door assembly 134 is in the closed position, e.g., during operation of laundry appliance 100. Door assembly 134 also includes a handle (not shown) that, e.g., a user may pull when opening and closing door assembly 134. Further, although door assembly 134 is illustrated as mounted to front panel 130, it should be appreciated that door assembly 134 may be mounted to another side of cabinet 102 or any other suitable support according to alternative embodiments.

Referring again to FIG. 2, laundry basket 120 also defines a plurality of perforations 140 in order to facilitate fluid communication between an interior of basket 120 and tub 124. A sump 142 is defined by tub 124 at a bottom of tub 124 along the vertical direction V. Thus, sump 142 is configured for receipt of and generally collects wash fluid during operation of laundry appliance 100. For example, during operation of laundry appliance 100, wash fluid may be urged by gravity from basket 120 to sump 142 through plurality of perforations 140.

A drain pump assembly 144 is located beneath tub 124 and is in fluid communication with sump 142 for periodically discharging soiled wash fluid from laundry appliance 100. Drain pump assembly 144 may generally include a drain pump 146 which is in fluid communication with sump 142 and with an external drain 148 through a drain hose 150. During a drain cycle, drain pump 146 urges a flow of wash fluid from sump 142, through drain hose 150, and to external drain 148. More specifically, drain pump 146 includes a motor (not shown) which is energized during a drain cycle such that drain pump 146 draws wash fluid from sump 142 and urges it through drain hose 150 to external drain 148.

A spout 154 is configured for directing a flow of fluid into tub 124. For example, spout 154 may be in fluid communication with a water supply 155 (FIG. 2) in order to direct fluid (e.g., clean water or wash fluid) into tub 124. Spout 154 may also be in fluid communication with the sump 142. For example, pump assembly 144 may direct wash fluid disposed in sump 142 to spout 154 in order to circulate wash fluid in tub 124.

As illustrated in FIG. 2, a detergent drawer 156 is slidably mounted within front panel 130. Detergent drawer 156 receives a wash additive (e.g., detergent, fabric softener, bleach, or any other suitable liquid or powder) and directs the fluid additive to wash chamber 126 during operation of laundry appliance 100. According to the illustrated embodiment, detergent drawer 156 may also be fluidly coupled to spout 154 to facilitate the complete and accurate dispensing of wash additive.

In optional embodiments, a bulk reservoir 157 is disposed within cabinet 102 and is configured for receipt of fluid additive or detergent for use during operation of laundry appliance 100. Moreover, bulk reservoir 157 may be sized such that a volume of fluid additive sufficient for a plurality or multitude of wash cycles of laundry appliance 100 (e.g., five, ten, twenty, fifty, or any other suitable number of wash cycles) may fill bulk reservoir 157. Thus, for example, a user can fill bulk reservoir 157 with fluid additive and operate laundry appliance 100 for a plurality of wash cycles without refilling bulk reservoir 157 with fluid additive. A reservoir pump (not shown) may be configured for selective delivery of the fluid additive from bulk reservoir 157 to tub 124.

In addition, a water supply valve or control valve 158 may provide a flow of water from a water supply source (such as a municipal water supply 155) into detergent dispenser 156 and/or into tub 124. In this manner, control valve 158 may generally be operable to supply water into detergent dispenser 156 to generate a wash fluid, e.g., for use in a wash cycle, or a flow of fresh water, e.g., for a rinse cycle. It should be appreciated that control valve 158 may be positioned at any other suitable location within cabinet 102. In addition, although control valve 158 is described herein as regulating the flow of "wash fluid," it should be appreciated that this term includes, water, detergent, other additives, or some mixture thereof.

A control panel 160 including a plurality of input selectors 162 is coupled to front panel 130. Control panel 160 and input selectors 162 collectively form a user interface input for operator selection of machine cycles and features. For example, in one embodiment, a display 164 indicates selected features, a countdown timer, and/or other items of interest to machine users.

Operation of laundry appliance 100 is controlled by a controller or processing device 166 (FIG. 1) that is operatively coupled to control panel 160 for user manipulation to select laundry cycles and features. In response to user manipulation of control panel 160, controller 166 operates the various components of laundry appliance 100 to execute selected machine cycles and features.

Controller 166 may include a memory and microprocessor, such as a general or special purpose microprocessor operable to execute programming instructions or microcontrol code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 166 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 160 and other components of laundry appliance 100 may be in communication with controller 166 via one or more signal lines or shared communication busses.

During operation of laundry appliance 100, laundry items are loaded into laundry basket 120 through opening 132, and washing operation is initiated through operator manipulation of input selectors 162. Tub 124 is filled with water, detergent, and/or other fluid additives, e.g., via spout 154 and or detergent drawer 156. One or more valves (e.g., control valve 158) can be controlled by laundry appliance 100 to provide for filling laundry basket 120 to the appropriate level for the amount of articles being washed and/or rinsed. By way of example for a wash mode, once laundry basket 120 is properly filled with fluid, the contents of laundry basket 120 can be agitated (e.g., with ribs 128) for washing of laundry items in laundry basket 120.

After the agitation phase of the wash cycle is completed, tub 124 can be drained. Laundry articles can then be rinsed by again adding fluid to tub 124, depending on the particulars of the cleaning cycle selected by a user. Ribs 128 may again provide agitation within laundry basket 120. One or more spin cycles may also be used. In particular, a spin cycle may be applied after the wash cycle and/or after the rinse cycle in order to wring wash fluid from the articles being washed. During a final spin cycle, basket 120 is rotated at relatively high speeds and drain pump assembly 144 may discharge wash fluid from sump 142. After articles disposed in laundry basket 120 are cleaned, washed, and/or rinsed, the user can remove the articles from laundry basket 120, e.g., by opening door assembly 134 and reaching into laundry basket 120 through opening 132.

While described in the context of a specific embodiment of horizontal axis laundry appliance 100, using the teachings disclosed herein it will be understood that horizontal axis laundry appliance 100 is provided by way of example only. Other laundry appliances having different configurations, different appearances, and/or different features may also be utilized with the present subject matter as well, e.g., vertical axis laundry appliances. Indeed, it should be appreciated that aspects of the present subject matter may further apply to other laundry appliances.

Referring still to FIG. 1, a schematic diagram of an external communication system 170 will be described according to an exemplary embodiment of the present subject matter. In general, external communication system 170 is configured for permitting interaction, data transfer, and other communications with laundry appliance 100. For example, this communication may be used to provide and receive operating parameters, user instructions or notifications, performance characteristics, user preferences, or any other suitable information for improved performance of laundry appliance 100.

External communication system 170 permits controller 166 of laundry appliance 100 to communicate with external devices either directly or through a network 172. For example, a consumer may use a consumer device 174 to communicate directly with laundry appliance 100. For example, consumer devices 174 may be in direct or indirect communication with laundry appliance 100, e.g., directly through a local area network (LAN), Wi-Fi, Bluetooth, Zigbee, etc. or indirectly through network 172. In general, consumer device 174 may be any suitable device for providing and/or receiving communications or commands from a user. In this regard, consumer device 174 may include, for example, a personal phone, a tablet, a laptop computer, or another mobile device.

In addition, a remote server 176 may be in communication with laundry appliance 100 and/or consumer device 174 through network 172. In this regard, for example, remote server 176 may be a cloud-based server 176, and is thus located at a distant location, such as in a separate state, country, etc. In general, communication between the remote server 176 and the client devices may be carried via a network interface using any type of wireless connection, using a variety of communication protocols (e.g. TCP/IP, HTTP, SMTP. FTP), encodings or formats (e.g. HTML, XML), and/or protection schemes (e.g. VPN, secure HTTP, SSL).

In general, network 172 can be any type of communication network. For example, network 172 can include one or more of a wireless network, a wired network, a personal area network, a local area network, a wide area network, the internet, a cellular network, etc. According to an exemplary embodiment, consumer device 174 may communicate with a remote server 176 over network 172, such as the internet, to provide user inputs, receive user notifications or instructions, etc. In addition, consumer device 174 and remote server 176 may communicate with laundry appliance 100 to communicate similar information.

External communication system 170 is described herein according to an exemplary embodiment of the present subject matter. However, it should be appreciated that the exemplary functions and configurations of external communication system 170 provided herein are used only as examples to facilitate description of aspects of the present subject matter. System configurations may vary, other communication devices may be used to communicate directly or indirectly with one or more laundry appliances, other communication protocols and steps may be implemented, etc. These variations and modifications are contemplated as within the scope of the present subject matter.

Figure 3:
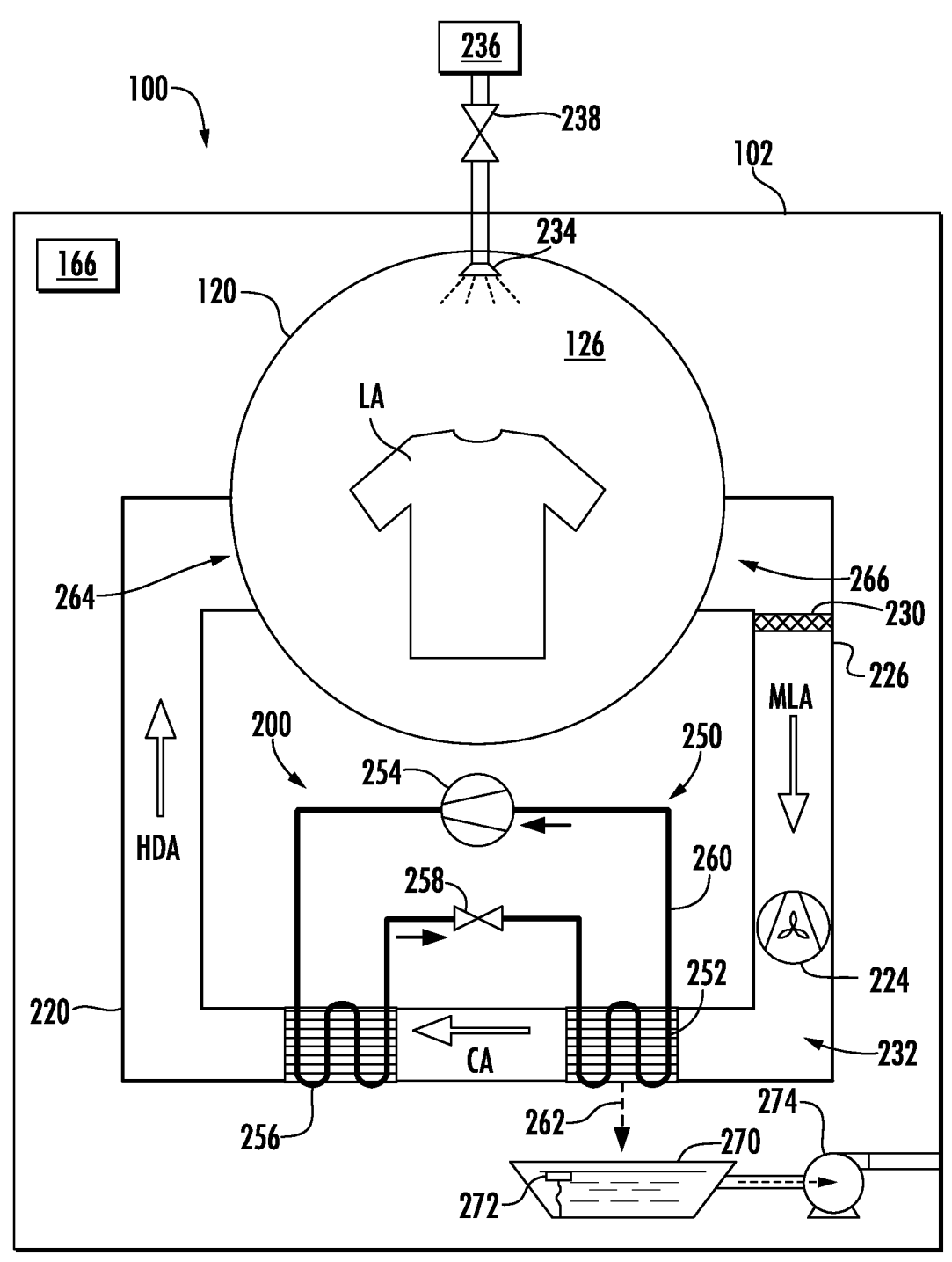
FIG. 3 provides a schematic diagram of an exemplary heat pump dryer appliance and a conditioning system thereof in accordance with exemplary embodiments of the present disclosure.

Referring now specifically to FIGS. 2 through 4, a heat pump system, a condenser system, a refrigerant-based air conditioning system, or another suitable conditioning system 200 for facilitating a drying process within laundry appliance 100 will be described in more detail. As illustrated, conditioning system 200 may be mounted to tub 124 such that it is fluidly coupled to chamber 126. More specifically, as illustrated, tub 124 extends between a front portion 202 and a back portion 204. e.g., along the transverse direction T. Laundry basket 120 also includes a back or rear wall 206, e.g., at back portion of laundry basket 120 or proximate back portion 204 of tub 124. Rear wall 206 of laundry basket 120 may be rotatably supported within cabinet 102 by a suitable bearing and/or may be fixed or rotatable.

Laundry basket 120 is generally cylindrical in shape. Laundry basket 120 has an outer cylindrical wall 208 and a front flange or wall that defines an opening 210 of laundry basket 120, e.g., at front portion 202 of laundry basket 120. As shown, opening 210 generally coincides with opening 132 of front panel 112 of cabinet 102, e.g., to provide user access to chamber 126 for loading and unloading of articles into and out of chamber 126 of laundry basket 120.

Conditioning system 200 may generally include a supply duct 220 that is mounted to tub 124 for circulating air within chamber 126 to facilitate a drying process. For example, according to the illustrated exemplary embodiment, supply duct 220 is fluidly coupled to tub 124 proximate opening 132 of front panel 130. More specifically, according to an example embodiment, supply duct 220 passes through a door gasket 222 that is mounted to tub 124 at opening 132 and is configured for forming a seal with door assembly 134 when door assembly 134 is in a closed position. Supply duct 220 receives heated air that has been heated and/or dehumidified by a conditioning system 200 and provides the heated air to laundry basket 120 via supply duct 220.

Specifically, moisture laden, heated air is drawn from laundry basket 120 by an air handler, such as a blower fan 224, which generates a negative air pressure within laundry basket 120. As the air passes from blower fan 224, it is circulated through chamber 126, enters a return duct 226, and then is passed into conditioning system 200. In some embodiments, the conditioning system 200 may be or include an electric heating element, e.g., a resistive heating element, or a gas-powered heating element, e.g., a gas burner. According to the illustrated exemplary embodiment, laundry appliance 100 is a heat pump dryer appliance and thus conditioning system 200 may be or include a heat pump including a sealed refrigerant circuit, as described in more detail below with reference to FIGS. 3 and 4. Heated air (with a lower moisture content than was received from laundry basket 120), exits conditioning system 200 and returns to laundry basket 120 by a supply duct 220. After the clothing articles have been dried, they are removed from the laundry basket 120 via opening 132.

As shown, laundry appliance 100 may further include one or more lint filters 230 (FIG. 3) to collect lint during drying operations. The moisture laden heated air passes through return duct 226 enclosing screen filter 230, which traps lint particles. More specifically, filter 230 may be placed into an air flow path 232 defined by laundry basket 120, conditioning system 200, return duct 226, and supply duct 220. Filter 230 may be positioned in the process air flow path 232 and may include a screen, mesh, or other material to capture lint in the air flow 232. The location of lint filters in laundry appliance 100 as shown in FIG. 3 is provided by way of example only, and other locations may be used as well. According to exemplary embodiments, lint filter 230 is readily accessible by a user of the appliance. As such, lint filter 230 should be manually cleaned by removal of the filter, pulling or wiping away accumulated lint, and then replacing the filter 230 for subsequent drying cycles.

According to exemplary embodiments, laundry appliance 100 may facilitate a steam dry process. In this regard, laundry appliance 100 may offer a steam drying cycle, during which steam is injected into chamber 126, e.g., to function similar to a traditional garment steamer to help remove wrinkles, static, etc. Accordingly, as shown for example in FIG. 3, laundry appliance 100 may include a misting nozzle 234 that is in fluid communication with a water supply 236 (e.g., such as water supply 155) in order to direct mist into chamber 126. Laundry appliance 100 may further include a water supply valve or control valve 238 for selecting discharging the flow of mist into chamber 126. It should be appreciated that control valve 238 may be positioned at any other suitable location within cabinet 102.

FIG. 3 provides a schematic view of laundry appliance 100 and depicts conditioning system 200 in more detail. FIG. 4 provides a perspective view of tub 124 with conditioning system 200 positioned on top of tub 124. For this embodiment, laundry appliance 100 is a heat pump dryer appliance and thus conditioning system 200 includes a sealed system 250. Sealed system 250 includes various operational components, which can be encased or located within a machinery compartment of laundry appliance 100. Generally, the operational components are operable to execute a vapor compression cycle for heating process air passing through conditioning system 200. The operational components of sealed system 250 include an evaporator 252, a compressor 254, a condenser 256, and one or more expansion devices 258 connected in series along a refrigerant circuit or line 260. Refrigerant line 260 is charged with a working fluid, which in this example is a refrigerant. Sealed system 250 depicted in FIG. 3 is provided by way of example only. Thus, it is within the scope of the present subject matter for other configurations of the sealed system to be used as well. As will be understood by those skilled in the art, sealed system 250 may include additional components, e.g., at least one additional evaporator, compressor, expansion device, and/or condenser. As an example, sealed system 250 may include two (2) evaporators.

In performing a drying and/or tumbling cycle, one or more laundry articles LA may be placed within the chamber 126 of laundry basket 120. Hot dry air HDA is supplied to chamber 126 via supply duct 220. The hot dry air HDA enters chamber 126 of laundry basket 120 via a supply opening 264 defined by laundry basket 120, e.g., the plurality of holes defined in rear wall 206 and/or cylindrical wall 208 of laundry basket 120 as shown in FIG. 2. The hot dry air HDA provided to chamber 126 causes moisture within laundry articles LA to evaporate. Accordingly, the air within chamber 126 increases in water content and exits chamber 126 as warm moisture laden air MLA. The warm moisture laden air MLA exits chamber 126 through a return opening 266 defined by laundry basket 120 and flows into return duct 226.

After exiting chamber 126 of laundry basket 120, the warm moisture laden air MLA flows downstream to conditioning system 200. Blower fan 224 moves the warm moisture laden air MLA, as well as the air more generally, through a process air flow path 232 defined by laundry basket 120, conditioning system 200, return duct 226, and supply duct 220. Thus, generally, blower fan 224 is operable to move air through or along the process air flow path 232. The duct system includes all ducts that provide fluid communication (e.g., airflow communication) between return opening 266 and conditioning system 200 and between conditioning system 200 and supply opening 264. Although blower fan 224 is shown positioned between laundry basket 120 and conditioning system 200 along return duct 226, it will be appreciated that blower fan 224 can be positioned in other suitable positions or locations along the duct system.

As further depicted in FIG. 3, the warm moisture laden air MLA flows into or across evaporator 252 of the conditioning system 200. As the moisture-laden air MLA passes across evaporator 252, the temperature of the air is reduced through heat exchange with refrigerant that is vaporized within, for example, coils or tubing of evaporator 252. This vaporization process absorbs both the sensible and the latent heat from the moisture-laden air MLA-thereby reducing its temperature. As a result, moisture in the air is condensed and such condensate water may be drained from conditioning system 200, e.g., using a drain line 262, which is also depicted in FIG. 3.

For this embodiment, a condenser tank or a condensate collection tank 270 is in fluid communication with conditioning system 200, e.g., via drain line 262. Collection tank 270 is operable to receive condensate water from the process air flowing through conditioning system 200, and more particularly, condensate water from evaporator 252. A sensor 272 is operable to detect when water within collection tank 270 has reached a predetermined level. Sensor 272 can be any suitable type of sensor, such as a float switch as shown in FIG. 3. Sensor 272 can be communicatively coupled with controller 166, e.g., via a suitable wired or wireless communication link. A drain pump 274 is in fluid communication with collection tank 270. Drain pump 274 is operable to remove a volume of water from collection tank 270 and, for example, discharge the collected condensate to an external drain. In some embodiments, drain pump 274 can remove a known or predetermined volume of water from collection tank 270. Drain pump 274 can remove the condensate water from collection tank 270 and can move or drain the condensate water downstream, e.g., to a gray water collection system. Particularly, in some embodiments, controller 166 is configured to receive, from sensor 272, an input indicating that water within the collection tank has reached the predetermined level. In response to the input indicating that water within collection tank 270 has reached the predetermined level, controller 166 can cause drain pump 274 to remove the predetermined volume of water from collection tank 270.

Air passing over evaporator 252 becomes cooler than when it exited laundry basket 120 at return opening 266. As shown in FIG. 3, cool air CA (cool relative to hot dry air HDA and moisture laden air MLA) flowing downstream of evaporator 252 is subsequently caused to flow across condenser 256, e.g., across coils or tubing thereof, which condenses refrigerant therein. The refrigerant enters condenser 256 in a gaseous state at a relatively high temperature compared to the cool air CA from evaporator 252. As a result, heat energy is transferred to the cool air CA at the condenser 256, thereby elevating its temperature and providing warm dry air HDA for resupply to laundry basket 120 of laundry appliance 100. The warm dry air HDA passes over and around laundry articles LA within the chamber 126 of the laundry basket 120, such that warm moisture laden air MLA is generated, as mentioned above. Because the air is recycled through laundry basket 120 and conditioning system 200, laundry appliance 100 can have a much greater efficiency than traditional clothes dryers can where all of the warm, moisture-laden air MLA is exhausted to the environment.

With respect to sealed system 250, compressor 254 pressurizes refrigerant (i.e., increases the pressure of the refrigerant) passing therethrough and generally motivates refrigerant through the sealed refrigerant circuit or refrigerant line 260 of conditioning system 200. Compressor 254 may be communicatively coupled with controller 166 (communication lines not shown in FIG. 3). Refrigerant is supplied from the evaporator 252 to compressor 254 in a low pressure gas phase. The pressurization of the refrigerant within compressor 254 increases the temperature of the refrigerant. The compressed refrigerant is fed from compressor 254 to condenser 256 through refrigerant line 260. As the relatively cool air CA from evaporator 252 flows across condenser 256, the refrigerant is cooled and its temperature is lowered as heat is transferred to the air for supply to chamber 126 of laundry basket 120.

Upon exiting condenser 256, the refrigerant is fed through refrigerant line 260 to expansion device 258. Although only one expansion device 258 is shown, such is by way of example only. It is understood that multiple such devices may be used. In the illustrated example, expansion device 258 is an electronic expansion valve, although a thermal expansion valve or any other suitable expansion device can be used. In additional embodiments, any other suitable expansion device, such as a capillary tube, may be used as well. Expansion device 258 lowers the pressure of the refrigerant and controls the amount of refrigerant that is allowed to enter the evaporator 252. Importantly, the flow of liquid refrigerant into evaporator 252 is limited by expansion device 258 in order to keep the pressure low and allow expansion of the refrigerant back into the gas phase in evaporator 252. The evaporation of the refrigerant in evaporator 252 converts the refrigerant from its liquid-dominated phase to a gas phase while cooling and drying the moisture laden air MLA received from chamber 126 of laundry basket 120. The process is repeated as air is circulated along process air flow path 232 while the refrigerant is cycled through sealed system 250, as described above.

Although laundry appliance 100 is depicted and described herein as a heat pump dryer appliance, the inventive aspects of the present disclosure can apply to other types of closed loop airflow circuit dryer appliances. For instance, in other embodiments, laundry appliance 100 can be a condenser dryer that utilizes an air-to-air heat exchanger instead of evaporator 252 and/or an electric heater may be provided instead of condenser 256. Thus, in such embodiments, the working fluid that interacts thermally with the process air may be air. In yet other embodiments, laundry appliance 100 can be a spray tower dryer appliance that utilizes a water-to-air heat exchanger instead of utilizing a sealed refrigerant. Thus, in such embodiments, the working fluid that interacts thermally with the process air may be water. Further, in some embodiments, laundry appliance 100 can be a combination washer/dryer appliance having a closed loop airflow circuit along which process air may flow for drying operations.

Referring now also to FIGS. 5 through 9, conditioning system 200 will be described in more detail according to example embodiments of the present subject matter. In this regard, as explained briefly above, it may be desirable to have a sufficiently sealed conditioning system 200 to prevent leakage of conditioned air. For example, this may be particularly desirable in order to prevent energy loss, to prevent the discharge of heat and/or humidity into the ambient environment, and to improve the overall drying performance of laundry appliance 100. Although exemplary constructions of conditioning system 200 are described below, it should be appreciated that variations and modifications may be made while remaining within the scope of the present subject matter.

As illustrated, conditioning system 200 may generally include a housing 300 that is generally configured for receiving sealed system 250 and/or other components of conditioning system 200. According to example embodiments, housing 300 may generally include a first portion 302 and a second portion 304 that are joined to form a sealed compartment 306. According to example embodiments, first portion 302 and second portion 304 may be joined using one or more mechanical fasteners 308. For example, the mechanical fasteners 308 may be screws, rivets, nuts and bolts, or any other suitable mechanical fastener. For example, first portion 302 and second portion 304 may be injection molded plastic components that form a clamshell to define sealed compartment 306 when joined using mechanical fasteners 308. According to example embodiments, sealed system 250 may be positioned within sealed compartment, e.g., for conditioning the air flowing within airflow path 232.

Figures 7, 8:
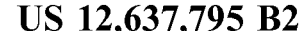
FIG. 7 provides a top view of the exemplary conditioning system of FIG. 3 in accordance with exemplary embodiments of the present disclosure.
FIG. 8 provides a cross-sectional view of a sealing element positioned within a groove of a first portion of a sealed system housing in accordance with exemplary embodiments of the present disclosure.
Figure 9:
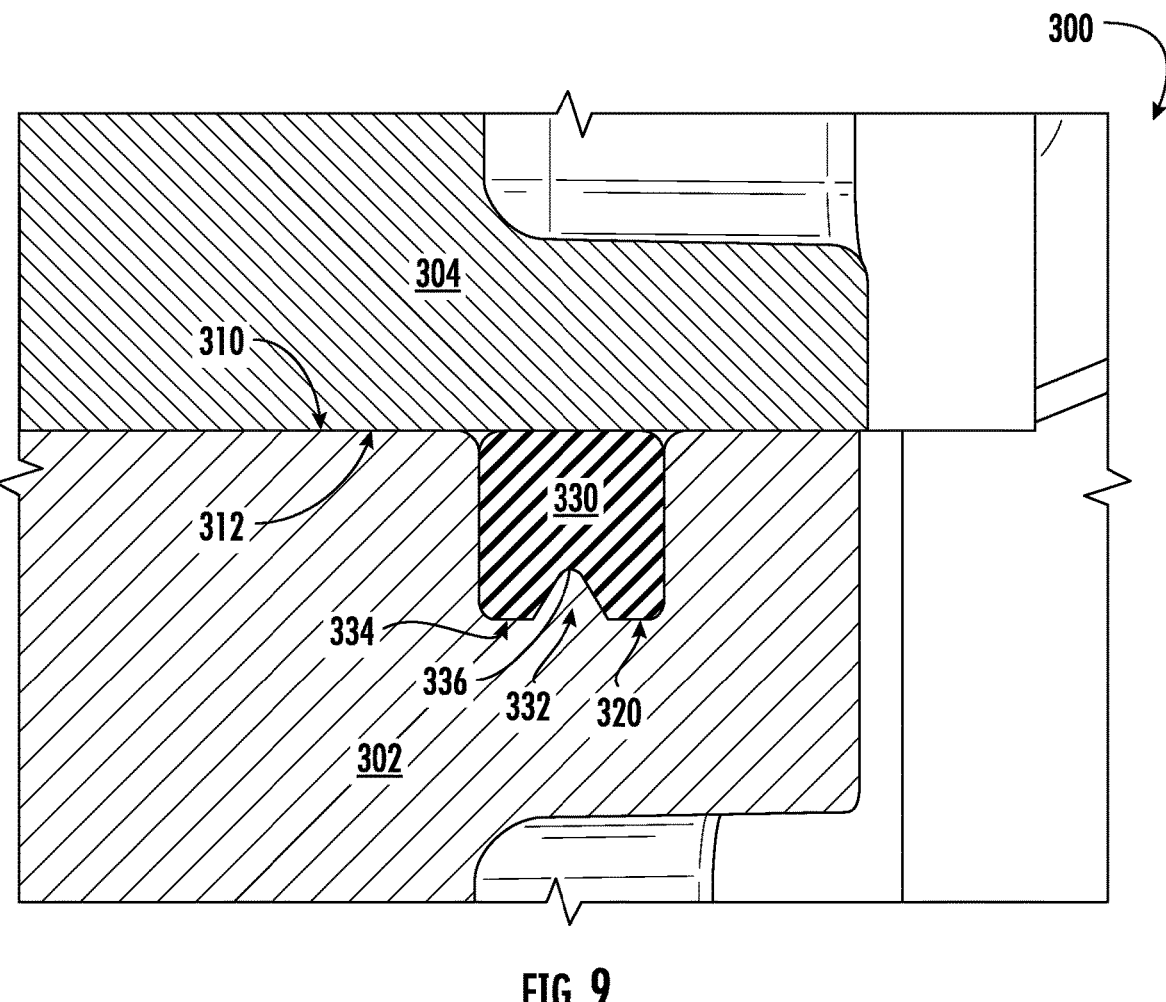
FIG. 9 provides a cross-sectional view of the exemplary sealing element of FIG. 8 in a compressed positioned when a second portion of the sealed system housing is joined to the first portion in accordance with exemplary embodiments of the present disclosure.

As best illustrated in FIGS. 8 and 9, first portion 302 and second portion 304 may define sealing surfaces that engage each other when first portion 302 and second portion 304 are joined. Specifically, first portion 302 may generally define a first sealing surface 310 and second portion 304 may generally define a second sealing surface 312 that may generally sit flush against each other when mechanical fasteners 308 are used to join first portion 302 and second portion 304. Notably, in order to improve the seal between first portion 302 and second portion 304, conditioning system 200 may further include features for receiving a sealing element, as described in more detail below.

Specifically, according to the illustrated embodiment, at least one of first portion 302 or second portion 304 may define a groove 320. In this regard, groove 320 may be recessed within at least one of first sealing surface 310 or second sealing surface 312. According to the illustrated embodiment, groove 320 is defined within first sealing surface 310 of first portion 302. In addition, groove 320 may extend fully around a perimeter 322 of housing 300. However, it should be appreciated that according to alternative embodiments, groove 320 may be defined within second portion 304, or may be at least partially defined within each of first portion 302 and second portion 304. Variations in the size, geometry, and position of groove 320 may be made while remaining within the scope of the present subject matter.

In general, conditioning system 200 may further include a sealing element 330 that is positioned within groove 320 when first portion 302 and second portion 304 are joined. In general, sealing element 330 may be any suitable resilient element that is configured to be compressed and/or deformed in order to create a fluid seal between first portion 302 and second portion 304. For example, according to example embodiments, sealing element may be a circular O-ring that is formed from a foam material, a rubber material, or any other suitable resilient plastic material. Sealing element 330 is illustrated in the relaxed or undeformed position in FIG. 8 and in the deformed position in FIG. 9.

Notably, housing 300 may define additional features that improve the performance of sealing element 330 and the operation of conditioning system 200. For example, according to the illustrated embodiment, a protruding feature 332 may generally extend into groove 320 for deforming sealing element 330 when first portion 302 and second portion 304 are joined. In general, protruding feature 332 may include any suitable number of bumps, knife edges, or other protrusions that are positioned within or extend into groove 320 for taking up space or otherwise facilitating deformation of sealing element 330.

For example, according to the illustrated embodiment, protruding feature 332 may extend from a bottom wall 334 of groove 320 defined within first portion 302. More specifically, protruding feature 332 may include a V-shaped knife edge 336 that is tapered from bottom wall 334 and extends toward second portion 304. Although described as a knife edge, it should be appreciated that protruding feature 332 may have any suitable radius or distal end profile, e.g., for minimizing the force required for compression. According to still other exemplary embodiments, a plurality of protruding features 332 may be positioned adjacent each other on bottom wall 334. In addition, it should be appreciated that protruding feature 332 may take any other shape, size, or position within groove 320.

According to the illustrated embodiment, protruding feature 332 extends from bottom wall 334 of groove 320 toward second portion 304. By contrast, according to alternative embodiments, protruding feature 332 may instead be defined on second portion 304. For example, protruding feature 332 may instead extend down from the flat portion of second sealing surface 312 into groove 320. In this manner, protruding feature 332 may help facilitate alignment between first portion 302 and second portion 304.

Referring still to FIGS. 8 and 9, groove 320 may generally define a groove height 340 and protruding feature 332 may generally define a protrusion height 342. In this regard, groove height 340 may be defined from bottom wall 334 to a top of groove 320 and protrusion height 342 may be defined from bottom wall 334 to knife edge 336 along the vertical direction V. According to example embodiments, protrusion height 342 may be between about 5% and 50%, between about 10% and 40%, between about 20% and 30%, or about 25% of groove height 340.

In addition, groove 320 may generally define a groove width 350 and protruding feature 332 may generally define a protrusion width 352. In this regard, groove width 350 may be defined between sidewalls of groove 320 and protrusion width 352 may be defined between the edges of a base of protruding features 332, e.g., at bottom wall 334, measured within a horizontal plane. According to example embodiments, protrusion height 342 may be between about 10% and 60%, between about 25% and 50%, or about 40% of groove width 350.

In addition, it may be desirable to select a groove width 350 that facilitates easy installation of sealing element 330. In this regard, according to an example embodiment, sealing element 330 may define a diameter 360 and groove width 350 may be less than diameter 360 of sealing element 330 before insertion into groove 320. For example, according to an example embodiment, sealing element may have a diameter of between about 1 and 10 mm, between about 2 and 5 mm, or about 3 mm. Notably, by having an interference fit between sealing element 330 in the relaxed position and the sidewalls of groove 320, an operator may place sealing element 330 into groove 320 where it may be retained during the remainder of the installation process, e.g., the joining of first portion 302 and second portion 304.

Notably, the geometry of groove 320 when combined with the geometry of protruding feature 332 and the construction of sealing element 330 provide for an improved conditioning system 200. In this regard, assembly is simplified, the fluid seal between first portion 302 and second portion 304 may be improved, and the number of fasteners required to form a fluid seal of housing 300 may be reduced, thereby reducing part costs and installation time. For example, due to the compressibility of sealing element 330 and the use of protruding feature 332, mechanical fasteners 308 may be positioned further apart (e.g., by greater than 6 inches, greater than 8 inches, greater than 10 inches, or greater) while still maintaining sufficient compressive force to deform sealing element 330 and create a fluid tight housing 300.

As explained herein, aspects of the present subject matter are generally directed to a sealing system for a sealed system of a combination washer/dryer laundry appliance. For example, a sealed system housing in a standard heat pump or dryer combination unit may include a conventional O-ring sandwiched between two portions of a sealed system housing. Notably, when the air path is sealed using such an O-ring configuration, a large compression force is needed to create an airtight sealed system. Failure to achieve an airtight system can result in lost thermal energy and/or humidity into the ambient environment, resulting in energy loss and poor system performance. By contrast, aspects of the present subject matter are directed to a sealed system housing that includes an O-ring groove including one or more additional compression features that minimizes force required to compress the O-ring. For example, to minimize the fasteners required to seal the housing, a combination of a foam rubber O-ring and a compression feature (e.g., a barb or protrusion) added at a top and/or bottom of the O-ring groove. This increases the sealing force and minimizes the assembly force, to ensure a quick warm-up of the sealed system and keeps unwanted heat and humidity out of the laundry room or maintains target humidity ratios.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A laundry appliance comprising:
   a tub positioned within a cabinet;
   a wash basket rotatably mounted within the tub, the wash basket defining a chamber for receipt of articles for washing and drying;
   a duct system fluidly coupled to the chamber and defining a process air flow path; and
   a conditioning system fluidly coupled to the process air flow path, the conditioning system comprising:
      a housing comprising a first portion and a second portion that are joined to form a sealed compartment, wherein a groove is defined in a sealing face of at least one of the first portion or the second portion;
      a sealed system positioned within the sealed compartment for conditioning air within the process air flow path;
      a sealing element positioned within the groove; and
      a protruding feature extending into the groove for deforming the sealing element when the first portion and the second portion are joined, wherein a cross-sectional area of the groove minus a cross-sectional area of the protruding feature is substantially equal to a cross-sectional area of the sealing element, such that the sealing element deforms to fill substantially all of the groove.

2. The laundry appliance of claim 1, wherein the protruding feature extends away from a bottom wall of the groove.

3. The laundry appliance of claim 1, wherein the groove extends fully around a perimeter of the housing.

4. The laundry appliance of claim 1, wherein the protruding feature is a V-shaped knife.

5. The laundry appliance of claim 1, wherein the groove is a first groove defined in the first portion, and wherein a second groove is defined in the second portion.

6. The laundry appliance of claim 1, wherein the groove is defined in the first portion and the second portion defines a flat sealing surface, wherein the protruding feature extends from the flat sealing surface.

7. The laundry appliance of claim 1, wherein the groove defines a groove height and the protruding feature defines a protrusion height, and wherein the protrusion height is between about 10% and 40% of the groove height.

8. The laundry appliance of claim 7, wherein the protrusion height is about 25% of the groove height.

9. The laundry appliance of claim 1, wherein the groove defines a groove width and the protruding feature defines a protrusion width, and wherein the protrusion width is between about 25% and 50% of the groove width.

10. The laundry appliance of claim 9, wherein the protrusion width is about 40% of the groove width.

11. The laundry appliance of claim 1, wherein the groove defines a groove width and the sealing element defines a diameter, wherein the groove width is less than the diameter of the sealing element before insertion into the groove.

12. The laundry appliance of claim 1, wherein the protruding feature is one of a plurality of protruding features defined in the groove for deforming the sealing element when the first portion and the second portion are joined.

13. The laundry appliance of claim 1, wherein the sealing element is formed from foam rubber.

14. The laundry appliance of claim 1, wherein the sealing element is a circular O-ring.

15. The laundry appliance of claim 14, wherein the circular O-ring has a diameter of about 3 millimeters.

16. The laundry appliance of claim 1, wherein the first portion and the second portion are joined by a plurality of fasteners, each of the plurality of fasteners being spaced apart by greater than 6 inches.

17. A conditioning system for a laundry appliance, the conditioning system comprising:

a housing comprising a first portion and a second portion that are joined to form a sealed compartment, wherein a groove is defined in a sealing surface of at least one of the first portion or the second portion;

a sealed system positioned within the sealed compartment for conditioning air within a process air flow path;

a sealing element positioned within the groove; and a protruding feature extending into the groove for deforming the sealing element when the first portion and the second portion are joined, wherein a cross-sectional area of the groove minus a cross-sectional area of the protruding feature is substantially equal to a cross-sectional area of the sealing element, such that the sealing element deforms to fill substantially all of the groove.

18. The conditioning system of claim 17, wherein the protruding feature extends away from a bottom wall of the groove and the groove extends fully around a perimeter of the housing.

19. The conditioning system of claim 17, wherein the groove is defined in the first portion and the second portion defines a flat sealing surface, wherein the protruding feature extends from the flat sealing surface.

20. The conditioning system of claim 17, wherein the groove defines a groove width and the sealing element defines a diameter, wherein the groove width is less than the diameter of the sealing element before insertion into the groove.

\* \* \* \* \*